A. W. K. BILLINGS.
FIRING INDICATOR AND RECORDER.
APPLICATION FILED AUG. 4, 1909.
974,017.
Patented Oct. 25, 1910.
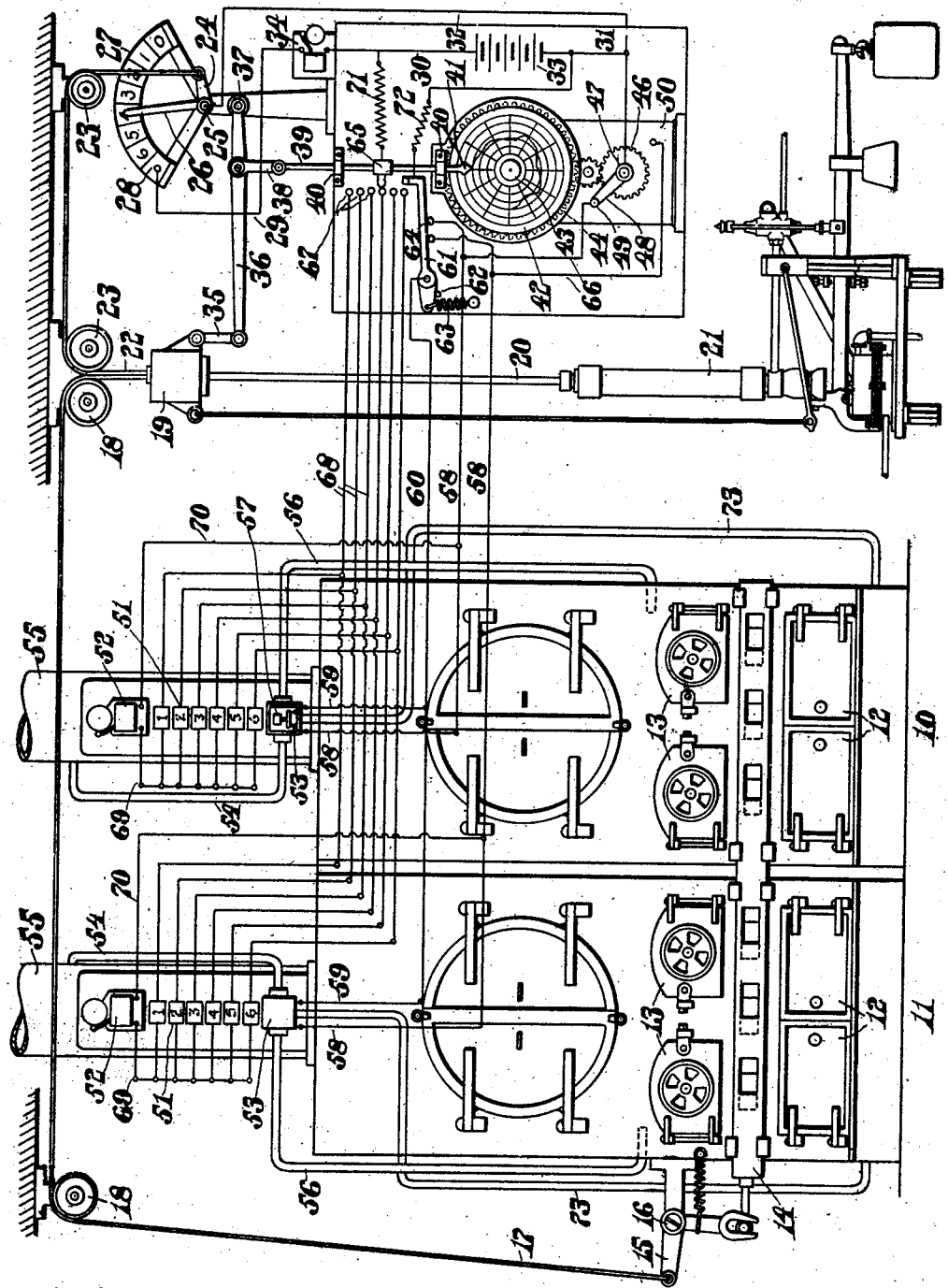
Witnesses:
Edna C. Cleveland
Nathan C. Lombard
Inventor:
Asa W. K. Billings,
by Walter E. Lombard,
Atty.

UNITED STATES PATENT OFFICE.

ASA WHITE KENNEY BILLINGS, OF HABANA, CUBA.

FIRING INDICATOR AND RECORDER.

974,017.  Specification of Letters Patent.  Patented Oct. 25, 1910.

Original application filed May 20, 1909, Serial No. 497,365. Divided and this application filed August 4, 1909. Serial No. 511,245.

*To all whom it may concern:*

Be it known that I, ASA WHITE KENNEY BILLINGS, a citizen of the United States of America, and a resident of Habana, in the Province of Habana and Republic of Cuba, have invented certain new and useful Improvements in Firing Indicators and Recorders, (which is a division of application Serial No. 497,365, filed May 20, 1909,) of which the following is a specification.

This invention relates to firing indicators for use in connection with heating devices, the object of the invention being to provide means automatically operated by the action of a mechanism for regulating the rate of combustion, for indicating to the fireman the rate at which fuel should be supplied to a plurality of heating devices and to each individual heating device.

The invention consists in providing an indicating arm operable by the movement of the device for regulating the rate of combustion which co-acts with a scale graduated in terms designating the rate at which fuel is to be supplied to the heating devices, said indicating arm also co-acting at one extreme of its movement with an electric contact, thereby making a circuit which operates an audible signal, this signal being for the purpose of indicating to the fireman that the temperature, pressure, or other variable controlling the regulating device, has reached the extreme value consistent with the proper operation of the heating device.

The invention further consists in attaching to the device for regulating the rate of combustion an indicating mechanism which displays the actual variations in the regulation of said rate of combustion in the heating device, said indicating mechanism being operated by suitable clock mechanism.

The invention further consists in providing each heating device with a plurality of signal devices, each of which is marked to indicate the rate at which fuel should be supplied to that particular heating device, and operating one of said signal devices on each of said heating devices at stated firing intervals, the times of firing being indicated by an audible signal controlled by a clock mechanism.

The invention further consists in providing each heating device with an alarm which is operated when the mechanism of the regulating device is in its extreme position, corresponding to the lowest or extreme permissible value of the variable which controls said regulating device, said alarm continuing to operate until the variable returns in value to its normal range.

The invention further consists in providing an excess air alarm operated in connection with a combustion indicator on each heating device, which alarm is operated when the presence of an excessive proportion of air in the combustion process requires attention and correction, the said excess air alarm continuing to operate until the conditions return to normal.

The invention further consists in certain novel features of construction and arrangement of parts which will be readily understood by reference to the description of the drawing and to the claims hereinafter given.

The drawing represents a diagrammatical view of two heating devices in the form of hand-fired steam boilers, a device for regulating the rate of combustion in same, in the form of a damper regulator controlling the dampers according to the variations in steam pressure, and the recording and indicating mechanisms operated thereby.

In the drawings, 10 and 11 are two boilers of any usual construction provided with the ashdoors 12 and the doors 13 through which the fuel is supplied to the usual firepot. A damper 14 provided with suitable openings regulates the admission of air to the fire-pot of the boiler, this damper 14 being connected to a bell crank lever 15 which is pivoted at 16 and is connected by means of a flexible member 17 passing over pulleys 18 to the weight 19 upon the piston-rod 20 of the damper regulator 21 of any well known construction, such, for instance, as the Locke damper regulator. This damper regulator 21 operates the damper 14 in the various boilers 10 and 11 in the usual manner, and it is obvious that while for convenience of illustration the damper 14 is shown beneath the firedoors 13 it may be located at any convenient point. The piston 19 of the damper regulator has also connected thereto a flexible member 22 passing over pulleys 23, the opposite end of which is connected to the bell crank lever 24 pivoted at 25, one arm of which forms a suitable indicator 26 which co-acts with a graduated scale 27 on which are suitable characters indicating the rates at which the fuel should be supplied to the heating devices.

While in the drawing the characters upon the scale indicate the number of shovelfuls of coal to be inserted into the fire-pot at each firing interval, it is obvious that if desired other designating characters could be applied thereto equally as well with the same results, provided that they indicate in any case the rates of supplying fuel, as, for example the number of pounds of coal per hour to be fed into the fire-pot, or the intervals in minutes between firing a stated amount of fuel at each time.

The graduated arc 27 at one end is provided with an electric contact 28 with which the indicator finger 26 is adapted to make contact when the weight 19 is in its lowest position. The finger 26 and the contact 28 are connected by means of the wires 29, 30, 31, and 32 to a battery 33 and audible signal such as the bell 34. It is obvious therefore that when the indicator finger 26 makes contact with the contact 28 an electric circuit will be completed and the bell or other audible signal 34 will be sounded to indicate to the fireman that the lowest permissible pressure has been reached, this bell continuing to ring until the fireman has paid the necessary attention to the fires and the pressure in the boilers has returned to within its normal range. The weight 19 is also connected by a link 35 to a lever 36 pivoted at 37, this lever 36 being connected by a link 38 to a member 39 reciprocable in bearings 40 and provided at its opposite end with a marking pen adapted to make a record upon a graduated dial 42 mounted upon the shaft 43 to which is secured a gear 44 driven by means of the clock mechanism 46.

On a shaft 47 of the clock mechanism 46 is secured an arm 48 which is adapted to be moved therewith and to connect at the termination of certain intervals with the contacts 49 and 50. To each of the heating devices or boilers are secured a plurality of visual signals, such as the annunciators 51, a bell or other audible signal 52, and a combustion indicator or excess air alarm 53. Each combustion indicator or excess air alarm is connected by a pipe 54 with the stack 55, and by means of a pipe 56 with the fire-pot, and by means of a pipe 73 with the ashpit of the heating device, so that variations in the drop in pressure through the fuel-bed and through the flue passages will operate, when there is an excess of air in either one of the heating devices over the permissible amount, a member 57 to make a contact between the terminals of the wires 58 and 59.

The wires 59 are connected by means of a wire 60 to the pivoted lever 61 retained in position against a stop 62 by means of a spring 63. The wires 58 each communicate with the terminals 64 with which the pivoted lever 61 makes contact when the contact member 65 on the recording member 39 engages with the insulated end of said pivoted lever 61 and forces it downwardly into engagement with said terminals 64.

The wires 58 are each connected by a wire 66 with the contact members 49 and 50. In the path of movement of the contact member 65 are a plurality of contact members 67 with which said movable contact member 65 is adapted to engage successively when it is operated by means of the rise and fall of the weight 19 of the damper regulator 21. Each of these contact members is connected by means of a wire 68 with one of the annunciators 51, each annunciator also being connected through the wire 69 with the bell 52 which in turn is connected by means of the wire 70 with the wire 58.

The contact member 65 is electrically connected by means of the wire 71 with the wire 30 and the pivoted member 61 is in like manner, by means of the wire 72, connected to the wire 31. When the regulator mechanism 21 moves to operate the indicating arm 34 and in so doing moves the contact member 65 up or down it causes said contact member to engage with one or another of the contact points 67. This contact of the member 65 with any particular member 67 causes the selection of the proper annunciator 51 to be operated to designate the amount of fuel to be supplied during each stated firing interval. The annunciator, however, is not operated until the finger 48 comes into contact with one of the contact members 49 or 50, as, for instance, when the finger 48 is in contact with the contact member 49, as shown in the drawing, a complete circuit is made from the battery 33 through the wire 31 to the finger 48, thence through the contact 49, wire 66, wire 58, wire 70 to the bell or other audible signal 52, wire 69, to the annunciator 51, wire 68, contact member 67, movable contact member 65, through the wire 71 and wire 30 to the battery 33. The completion of this circuit causes the bell 52 to be rung and the selected annunciator to be displayed to indicate to the fireman the amount of coal to be supplied to the furnace of the boiler on which the annunciator is displayed. Should this movable contact member 65 remain in contact with the same member 67 until the finger 48 reaches the contact member 50, the corresponding annunciator would be operated on the other boiler 11.

The annunciators preferably used are those known as automatic electric re-setting annunciators, each signal re-setting the drop which fell previously so that each signal is in view of the fireman until another of the same set is caused to drop when the finger 48 comes into contact again with one of said contact members 49 or 50.

Obviously, if desired, the fireman may reset the signals by hand as soon as he has completed the firing, or the re-setting may be accomplished by the opening of the firedoor. As, however, the manner of re-setting the annunciator or the particular form of annunciator forms no part of the present invention these devices are not illustrated or described in detail herein.

When the pressure, or other variable controlling the regulating device, gets so low that the movable member 65 reaches the lowest contact member 67 it will engage with the member 61 and move it about its pivot so that contacts will be made with the terminals 64. When this has been accomplished an electric circuit will be completed from the battery 33, through the wires 72, the member 61, through the wires 58 and 70 to the bells 52, then through the wire 69 to the lowest annunciator 51, then through the wires 68 to the lowest contact member 67 through the movable contact member 65 and wires 71 and 30 to the battery 33.

All of the bells on all of the boilers or heating devices will at this time ring and continue to ring until the fires have been attended to and the pressure, or other variable, returns to its normal range and causes the upward movement of the movable member 65, thus permitting the spring 63 to act upon the lever 61 to move it about its pivot against the stop 62 and thus break the contact between said finger 61 and the terminals 64.

The disk 42 is moved uniformly by the clock mechanism 46 which may be of any usual construction and connected to said disk in any well-known manner for the purpose of causing its rotation.

It is obvious that in the construction shown that the movable contact member 65, whose movement is controlled by the regulator 21, simply selects from time to time the signal corresponding to the amount of fuel to be supplied to the furnaces 10 and 11, this amount being determined by the value at that instant of the pressure, or other variable controlling the regulating device, while the particular boiler to which the fuel is to be supplied is determined by the contacts caused to be made by the clock mechanism, these contacts being made at stated firing intervals as predetermined.

The combustion indicator, or excess air alarm, of each heating device is independently connected in circuit so that when the proportional amount of air passing through the furnace of that particular boiler is abnormal the bell for that particular boiler is rung so as to call the attention of the fireman to the corresponding furnace to which attention must be given to maintain efficient combustion conditions. When such a marked excess of air is passing through the furnace of either one of the heating devices, the changes in the ratio of the resulting pressure differences in the furnace and flue-passages due to this excess of air will act upon the member 57 to cause it to be moved into contact with the terminals of the wires 58 and 59 and cause a circuit to be made between these wires. When this has been accomplished a circuit is completed from the battery 33 to the wires 72, the pivoted lever 61, the wire 60, the wires 59, through the bridge member 57 to the wire 58, then through the wire 70 to the bell 52, wire 69, through one of the annunciators 51, its connecting wires 68, to one of the contacting members 57, and then through the movable contact member 65 and its connecting wire 71 to the wire 30, and back to the battery 33. When this circuit has been completed the bell 52 will be rung and will continue to ring until the fireman restores the fire in this particular furnace to normal conditions.

It is obvious that the rate of combustion, or the conditions influencing them, may be controlled in other ways than by opening and closing a damper, as, for example, by increasing and decreasing the speed of a fan supplying air to the furnace or exhausting the products of combustion therefrom. It is also obvious that the regulation of the rate of combustion, or of the conditions influencing them, may be controlled by any other variable, influenced by or depending upon said combustion and whose variation it is desired to limit, instead of by the steam pressure in a boiler forming part of said heating device, as, for example, by the resulting temperature at some given point in the heating device, or by the composition of the products of combustion. It is therefore obvious that the present invention provides a suitable apparatus for indicating to the person or persons in charge of a boiler or other heating device the conditions of combustion within said heating device or the average condition of several of these devices working in conjunction, in order that he or they may regulate the rate of supply of fuel to the requirements of the heating devices in a manner which has been predetermined as the most suitable. By such a mechanism the efficiency and regularity of operation of said heating devices may be materially improved as by such means the irregular firing and control which is usually practiced is wholly avoided, this being accomplished by means of an audible or visible signal varying with the needs of the heating devices and determining the rate at which fuel should be supplied to said heating devices.

Ordinarily in boiler-room or furnace practice the only guide to the damper opening or strength of draft permitted or the rate at which fuel should be supplied is the judgment of the fireman, who determines the amount of fuel to be supplied and the time for firing by the appearance of the fire and the variations in the steam pressure or other variable affected by the combustion. The most efficient results are in nearly all cases obtained only at the expense of unremitting attention and greatly increased labor. Nevertheless there is no practical and satisfactory means at present for enabling the employer to distinguish between the work of a careful and skilled fireman and that of a lazy or incompetent one. The total amount of coal is of course an index, but the responsibility for poor work is not usually observed and cannot be fixed with certainty. Neither is the uniformity of the steam pressure a safe guide. It is quite obvious that the result of such practice under these conditions must be very unsatisfactory and lack uniformity, this lack of uniformity varying with the skill and industry of the various firemen.

When a damper regulator is attached to the boiler the steam pressure becomes much steadier and the general conditions are improved, but the position of the damper, and therefore the draft at which the fuel is burned still depends entirely on the rate at which the fireman sees fit to supply the fuel to the furnace. If supplied at too great a rate the damper at first nearly closes, with the result that imperfect combustion and consequent loss of efficiency occurs, and with certain classes of coals clinker forms in large masses, choking the fire and causing the damper to open wide without being able to maintain the desired steam pressure or temperature. If, on the other hand, the fireman supplies the fuel at too slow a rate the damper opens wider than desirable and the fire becomes uneven and too thin, with the resulting loss in efficiency by reason of the excess air allowed to enter the furnace, leaving the fire in a condition in which it is unable to respond to calls for more steam, and allowing the pressure of the latter to drop to a point where it interferes with regular operation. Hence the addition of a regulator has a tendency, because of the fact that it takes care of the steam pressure under normal conditions, to lead to irregular operation or neglect of the fires, with the consequent lack of efficiency and occasional low pressure.

By means of the apparatus herein shown and described the need of skill in judging the condition and requirements of the fire on the part of the fireman is almost wholly eliminated and in lieu thereof he is shown by audible and visual signals constantly the desired manner of firing, as determined by the adjustment of the relations of the different signals to the different conditions of the heating devices, previously found to give the best results in practice. It furthermore permits, by means of the records made, the determination of the manner in which these signals have been followed, and the responsibility for any loss of efficiency or low steam pressure due to improper handling of the heating devices or careless disregard of the signals can be fixed without hesitation or doubt.

In the adjustment of the apparatus by the person in charge to suit the class of fuel and furnace conditions existing at that time, the thickness of the uniform bed of fuel or rate of supply of same and the strength of draft which give the highest efficiency for each value of the demand on the heating device are determined by analyses of the flue gases and by actual observation of the efficiency and the compensating attachment on the regulator, the position of the various contacts and the marking of the scales and annunciators are adjusted to secure the desired result under each set of conditions.

It is believed that the operation and many advantages of the invention will be thoroughly understood without any further description.

Having thus described my invention, I claim:

1. In an apparatus of the class described, the combination with a plurality of heating devices provided with a device for regulating the rate of combustion common to all; of a movable electric contact operated by the movement of said regulating device; a plurality of fixed contacts adapted to be engaged by said movable contact; a plurality of electrically operated signals on each heating device, each of which signals is provided with characters designating the required rate of supply of fuel to the said heating device; a wire from each set of corresponding signals to one of said fixed contacts; a clock mechanism; and means operable by said clock mechanism for selecting the set of signals in which a particular signal is adapted to be operated by said regulating mechanism at each predetermined firing interval.

2. In an apparatus of the class described, the combination with a plurality of heating devices provided with a device for regulating the rate of combustion common to all; of a movable electric contact operated by the movement of said regulating device; a plurality of fixed contacts adapted to be engaged by said movable contact; a plurality of electrically operated signals on each heating device, each of which signals is provided with characters designating the required rate of supply of fuel to the said heating device; a wire from each set of corresponding signals to one of the said fixed contacts; a clock mechanism; an audible signal; and a make and break device operated by said clock mechanism for operating said audible signal at predetermined intervals.

3. In an apparatus of the class described, the combination with a plurality of heating devices provided with a device for regulating the rate of combustion common to all; of a plurality of visual signals on each heating device; a clock mechanism for operating one of said signals on each of said heating devices at stated intervals; and means operable by said regulating mechanism for selecting the particular signal to be operated.

4. In an apparatus of the class described, the combination with a plurality of heating devices provided with a device for regulating the rate of combustion common to all; of a plurality of visual signals on each heating device; a clock mechanism for operating one of said signals on each of said heating devices at stated intervals; means operable by said regulating mechanism for selecting the particular signal to be operated; and an audible signal adapted to be operated by said clock mechanism when said visual signal is displayed.

5. In an apparatus of the class described, the combination with a plurality of heating devices provided with a device for regulating the rate of combustion common to all; of a movable electric contact operated by the movement of said regulating device; a plurality of fixed contacts adapted to be engaged by said movable contact; a plurality of electrically operated signals on each heating device, each of which signals is provided with characters designating the required rate of supply of fuel to the said heating device; a wire from each set of corresponding signals to one of said fixed contacts; an electric circuit for each heating device including its indicating signals; and automatic means for completing the circuit of one of said heating devices at the end of each predetermined firing interval.

6. In an apparatus of the class described, the combination with a plurality of heating devices provided with a device for regulating the rate of combustion common to all; of a plurality of visual signals on each heating device; means operable by said regulating mechanism for placing in circuit the corresponding signals for all the heating devices; and automatic means for operating one of said signals on one of said heating devices thus placed in circuit at the end of a predetermined firing interval.

7. In an apparatus of the class described, the combination with a plurality of heating devices provided with a device for regulating the rate of combustion common to all; of a plurality of visual signals on each heating device; and means operable by said regulating mechanism for placing in circuit the corresponding signals for all the heating devices; and automatic means for operating one of said signals on one of said heating devices thus placed in circuit at stated intervals.

8. In an apparatus of the class described, the combination with a plurality of heating devices provided with a device for regulating the rate of combustion common to all; of a plurality of visual signals on each heating device; means operable by said regulating mechanism for placing in circuit the corresponding signals for all the heating devices; automatic means for operating one of said signals on one of said heating devices thus placed in circuit at the end of a predetermined firing interval; a combustion indicator on each heating device; an audible signal on each heating device; and a device controlled by each combustion indicator for connecting two terminals in an electric circuit and operating said audible signal when the proportion of excess air in said heating device is higher than a predetermined amount.

9. In an apparatus of the class described, the combination with a plurality of heating devices provided with a device for regulating the rate of combustion common to all; of a plurality of visual signals on each heating device; means operable by said regulating mechanism for placing in circuit the corresponding signals for all the heating devices; and automatic means for successively operating at stated intervals said corresponding signals on each of said heating devices thus placed in circuit.

10. In an apparatus of the class described, the combination with a plurality of heating devices provided with a device for regulating the rate of combustion common to all; of a plurality of visual signals on each heating device; means operable by said regulating mechanism for placing in circuit the corresponding signals for all the heating devices; a clock mechanism; and means operable by said clock mechanism for successively operating at stated intervals said corresponding signals on each of said heating devices thus placed in circuit.

Signed by me at New York city, New York this 28th day of July, nineteen hundred and nine.

ASA WHITE KENNEY BILLINGS.

Witnesses:
OTTO E. SCHENKE,
CLARENCE A. CHASE.